US012768694B2

(12) United States Patent
Stefani et al.

(10) Patent No.: US 12,768,694 B2
(45) Date of Patent: Oct. 20, 2026

(54) DEVICE FOR MEASURING A FLOW RATE OF A LIQUID

(71) Applicant: DANA ITALIA S.R.L., Arco (IT)

(72) Inventors: Matteo Stefani, Reggio Emilia (IT); Alessandro Sassi, Reggio Emilia (IT)

(73) Assignee: DANA ITALIA S.R.L., Arco (IT)

( * ) Notice: Subject to any disclaimer, the term of this patent is extended or adjusted under 35 U.S.C. 154(b) by 296 days.

(21) Appl. No.: 18/582,454

(22) Filed: Feb. 20, 2024

(65) Prior Publication Data

US 2024/0280394 A1 Aug. 22, 2024

(30) Foreign Application Priority Data

Feb. 21, 2023 (DE) ..................... 20 2023 100 818.6

(51) Int. Cl.
*G01F 9/00* (2006.01)

(52) U.S. Cl.
CPC .................................... *G01F 9/001* (2013.01)

(58) Field of Classification Search
CPC ....................................................... G01F 9/001
USPC ............................................................ 73/223
See application file for complete search history.

(56) References Cited

U.S. PATENT DOCUMENTS 3,580,092 A 5/1971 Edison
4,549,432 A * 10/1985 Bland ..................... G01F 15/08 96/174
7,080,551 B2 7/2006 Tani et al.
9,410,833 B1 8/2016 Leaders et al.
2007/0090296 A1* 4/2007 Hoyt ......................... G01F 3/10 250/357.1
2011/0283810 A1* 11/2011 Hoefelmayr .......... G01F 11/284 73/861.53
2018/0156711 A1* 6/2018 Vrane ................ G01N 15/1459
2020/0408128 A1* 12/2020 Fanøe .................. F01N 3/2066

FOREIGN PATENT DOCUMENTS

DE 102008057819 A1 * 5/2010 ................ A01J 5/01

OTHER PUBLICATIONS

Hoefelmayr (Year: 2010).*

* cited by examiner

*Primary Examiner* — Peter J Macchiarolo
*Assistant Examiner* — Rodney T Frank
(74) *Attorney, Agent, or Firm* — McCoy Russell LLP

(57) ABSTRACT

The present disclosure relates to a device for measuring a flow rate of a liquid, comprising a flow channel, a valve for selectively opening and closing the flow channel, and a measuring unit configured to determine, after the valve has closed the flow channel, a time Δt which it takes a liquid fed to the flow channel above the valve to rise to an upper predetermined liquid level in the flow channel.

15 Claims, 2 Drawing Sheets

Section II-II

Section IV-IV

DEVICE FOR MEASURING A FLOW RATE OF A LIQUID

CROSS-REFERENCE TO RELATED APPLICATION

The present application claims priority to German Utility Model Application No. 20 2023 100 818.6, entitled "DEVICE FOR MEASURING A FLOW RATE OF A LIQUID", and filed Feb. 21, 2023. The entire contents of the above-listed application is hereby incorporated by reference for all purposes.

TECHNICAL FIELD

The subject matter of the present disclosure relates to a device for measuring a flow rate of a liquid. Devices of this type may be applicable in the area of mechanical engineering and in the area of hydraulics.

BACKGROUND AND SUMMARY

In the field of hydraulics it is common practice to measure the flow rate of a hydraulic medium flowing through a hydraulic unit such as a hydraulic pump/motor or a hydraulic cylinder, into a hydraulic unit or out of a hydraulic unit in order to evaluate the performance of the unit and its efficiency. Known devices for measuring flow rates are usually connected to the hydraulic unit by a flow channel, e.g. a pipe, having specific dimensions, and a fluid passing through the flow rate measuring device typically generates a pressure drop which may depend on the velocity of the fluid. For this purpose, the hydraulic unit the flow rate of which is intended to be measured, usually has to create a certain hydraulic pressure and maintain it for a certain flow rate. However, some hydraulic units may not fulfill this requirement.

Known devices for measuring a flow rate include turbines, gears, differential pressure devices, vortex devices and mass flowmeters, for example. In the prior art, various methods and devices for measuring flow rates of liquids are used.

For example, U.S. Pat. No. 9,410,833 B1 discloses fluid device for measuring a flow rate of water using an ultrasound measurement system.

U.S. Pat. No. 7,080,551 B2 discloses a measurement device measuring a flow rate using a bubble in a liquid which moves along with the liquid in a transparent passage, wherein a flow rate may be assessed by measuring the velocity of the bubble.

U.S. Pat. No. 3,580,092 describes a clamp-on device for measuring a flow rate which detects ultrasonic radiation in a pipe generated by the shear action of the fluid flowing in the pipe.

Depending on the specific kind of device for measuring a flow rate used, there are usually several factors to be taken into consideration, such as:

Fluid Type, viscosity of the fluid, the type of connection to the device, the size of the pipe, the process temperature (min & max), the range of the flow rate (min & max) to be measured, the pressure range (min & max), the desired accuracy range and potentially additional parameters that may depend on the specific application.

In any case, most known devices for measuring a flow rate, for example so-called "invasive" devices, usually introduce an obstruction that increases the pressure of the fluid upstream of the obstruction. This can in many applications disturb the measurement and impair measurement accuracy.

Another type of a device for measuring a flow rate is the clamp-on device for measuring a flow rates which have to be attached to an outside of a pipe. However, in order to obtain reliable measurement results, the pipe dimension and flow rate typically have to be in specific operating ranges. For example, this type of flow meter often does not allow reliable measurements at very low flow rates or when measuring the flow rate of a pulsating flow.

Considering the background of the technology of flow rate measurements, there is demand for a device which allows measuring the flow rate of a liquid independent of the specific dimensions of the pipe and which can be applied in systems with low or very low flow rates and in systems with a pulsating flow.

This demand is met by a device for measuring a flow rate of a liquid including the features as described herein.

In an example, the presently proposed device for measuring a flow rate of a liquid comprises:

- a flow channel,
- a valve for selectively opening and closing the flow channel, and
- a measuring unit configured to determine, after the valve has closed the flow channel, a time $\Delta t$ which it takes a liquid fed to the flow channel above the valve to rise to an upper predetermined liquid level in the flow channel.

In the context of this disclosure, a liquid may comprise or may consist of any type of material that flows under the influence of gravity, including liquids, such as hydraulic liquids, possibly also gases or materials like sand or generally materials that are able to trickle.

The present disclosure primarily relates to a device for measuring a flow rate for hydraulic applications which can measure a flow rate without introducing a pressure drop. This typically allows measuring the flow rate also in pipes or conduits that are under very low pressure or which do not endure higher pressure.

For example, the presently proposed device for measuring a flow rate may be configured to be connected, among other things, to all kinds of units that cannot produce significant pressure levels. The device for measuring a flow rate may be independent of the pipe dimension and it can be used in systems with a flow rate close to zero, for example for measuring leakage rates, as well as for measuring a pulsating flow. For instance, the presently proposed device for measuring a flow rate can be integrated in pipes or pipelines. Additionally or alternatively, the presently proposed device for measuring a flow rate can be employed as an external device. For instance, the presently proposed device for measuring a flow rate can be activated and used upon request. Typically, the device introduces no mechanical wear.

For example, the device can be used to measure a wide range of flow rates, such as by adding one or more connected devices in series and thereby adding volume to the flow channel without affecting measurement accuracy.

The flow channel including the sections where a liquid level detection device may be positioned may have different shapes or cross sections, including circular, elliptical, or polygonal cross sections.

The device according to the present disclosure may allow measuring a liquid flow independent of the viscosity of the liquid or its temperature.

One example of an application of the device according to the present disclosure is the measurement of the internal leakage of hydraulic spool valves. The internal leakage flow rate is close to zero and the pipe cannot be put under pressure. Therefore, it may be necessary or advantageous to use a non-invasive method. The device according to the present disclosure solves this problem and the measurement is performed by an automatic system which will be described in more detail below.

The measuring unit is usually configured to determine a flow rate q of a liquid fed to the flow channel above the valve according to $q=\Delta V/\Delta t$, wherein $\Delta V$ is a known volume of a portion of the flow channel through which the liquid rises to the upper predetermined liquid level. For example, $\Delta V$ may account for at least 50 percent, at least 70 percent, or at least 90 percent of a section of the flow channel extending from the valve to the upper predetermined liquid level.

The measuring unit may comprise an upper liquid level detection device configured to determine if a liquid level in the flow channel has reached the upper predetermined liquid level. The upper liquid level detection device may be disposed outside of the flow channel, for example next to the flow channel. For example, the measuring unit may be configured to determine $\Delta t$, i.e. the time it takes a liquid fed to the flow channel above the valve to rise to the upper predetermined liquid level in the flow channel, based on a point in time $t_U$ at which the liquid level reaches the upper predetermined liquid level.

The measuring unit may also comprise a lower liquid level detection device configured to determine if a liquid level in the flow channel has reached a lower predetermined liquid level disposed at the valve, or disposed in between the valve and the upper predetermined liquid level. The lower liquid level detection device may be disposed outside of the flow channel, for example next to the flow channel. For example, the measuring unit may be configured to determine $\Delta t$ further based on a point in time $t_L$ at which the liquid level reaches the lower predetermined liquid level. In case the lower predetermined liquid level is disposed at or defined by a position of the valve, $t_L$ is given by the point in time at which the valve closes and the liquid level in the flow channel starts to rise above the valve. More specifically, the measuring unit may be configured to determine $\Delta t$ according to $\Delta t=t_U-t_L$.

Either one or both of the upper liquid level detection device and the lower liquid level detection device may not be configured to measure a liquid level in the flow channel above the valve independently of its/their position. Rather, either one or both of the upper liquid level detection device and the lower liquid level detection device may be configured to detect the liquid level only when or once the liquid level reaches or has reached the upper predetermined liquid level and/or the lower predetermined liquid level, respectively. That is, the upper liquid level detection device may be configured to provide a binary yes/no information stating whether or not the liquid level in the flow channel above the valve has reached the upper predetermined liquid level. And the lower liquid level detection device may be configured to provide a binary yes/no information stating whether or not the liquid level in the flow channel above the valve has reached the lower predetermined liquid level.

The upper liquid level detection device and/or the lower liquid level detection device may comprise at least one of a liquid sensor, a float switch of a known type, an electrical sensor, such as a resistive sensor, a magnetic sensor, and an optical sensor, for example. However, the upper liquid level detection device and/or the lower liquid level detection device are not restricted to the above-mentioned sensors/switches.

The liquid sensor may be any type of sensor that detects the presence of a liquid. For example, the liquid sensor may include but is not limited to a capacitor whose capacitance changes in the presence of a liquid, such as when a liquid enters a gap between the electrodes of the capacitor. The contact sensor may include one or more electrodes integrated in or put flat on the inner wall of the flow channel, wherein the electrodes may measure an electrical parameter like a capacity or an electric resistance or inductivity. The optical sensor may comprise a camera configured to produce image data, and a programmable processor configured to process the image data.

The optical sensor may comprise a camera taking one or more pictures through a transparent wall or window of the flow channel and an electronic device configured to determine, based on the one or more pictures taken by the camera, if a liquid level is visible or not. For this purpose, an optical sensor may also comprise a light waveguide and/or may be configured to detect a change of colour or brightness at a transparent part of the wall of the flow channel when the liquid level is visible. In this context, the term “liquid level” may not only refer to the position of the surface of the liquid. Additionally or alternatively, the term “liquid level” may also refer to a detectable separation line between the liquid and air or any other fluid or material which is located above the liquid level.

Alternatively, the optical sensor may include a light source such as a laser, an LED or a lamp, and a light detector, wherein a power or an intensity detected by the light detector changes as the liquid level in the flow channel reaches the upper predetermined liquid level and/or the lower predetermined liquid level, respectively. However, it is understood that the upper and/or lower liquid level detection device is/are not limited to the aforementioned implementations.

The presently proposed device for measuring a flow rate of a liquid may further comprise an assembly disposed at least partially in the flow channel and configured to change a volume of the flow channel, for example in between the valve and the upper predetermined liquid level, or in between the lower predetermined liquid level and the upper predetermined liquid level. For instance, if the flow rate to be measured is low, it may be advantageous to speed up the measurement process by reducing the volume of the flow channel in between the valve and the upper predetermined liquid level. Similarly, if the flow rate to be measured is high, it may be advantageous to reduce the speed of the measurement process by increasing the volume of the flow channel in between the valve and the upper predetermined liquid level. For example, the assembly for changing the volume of the flow channel may comprise a piston which may be at least partially moved into the flow channel and/or an inflatable balloon which may be inflated at least partially within the flow channel.

The flow channel may have a first end and a second end below the first end. An inlet port of the flow channel may be disposed at the first end of the flow channel. An outlet port of the flow channel may be disposed at the second end of the flow channel. The valve is then typically configured to close the flow channel at or above the outlet port.

The flow channel may comprise an upper section including the upper predetermined liquid level and an intermediate section extending between the valve and the upper section. A maximum cross sectional area of the upper section may be smaller than a minimum cross sectional area of the intermediate section, for example by a factor of two or more, or by a factor of four or more. For instance, a volume of the intermediate section of the flow channel may account for at least 50 percent, at least 70 percent, or at least 90 percent of a volume of a portion of the flow channel extending from the valve to the upper predetermined liquid level. The upper section of the flow channel may have a constant cross sectional area or may comprise a section having a constant cross sectional area. Similarly, the intermediate section of the flow channel may have a constant cross sectional area or may comprise a section having a constant cross sectional area.

Determining whether the liquid level in the flow channel has reached the upper predetermined liquid level in the narrower upper section of the flow channel may increase the accuracy of a measurement of the volume ΔV through which the liquid in the flow channel rises to the upper predetermined liquid level, because in the narrower upper section the liquid level rises faster as ΔV increases.

The flow channel may comprise a lower section including the lower predetermined liquid level and extending between the valve and the intermediate section. A maximum cross sectional area of the lower section may be smaller than the minimum cross sectional area of the intermediate section, for example by a factor of two or more, or by a factor of four or more. The lower section of the flow channel may have a constant cross sectional area or may comprise a section having a constant cross sectional area.

Determining whether the liquid level in the flow channel has reached the lower predetermined liquid level in the narrower lower section of the flow channel may increase measurement accuracy as an inaccurate measurement in the narrower lower section of the flow channel may change the measured liquid volume only by a small amount.

Since the volume ΔV, which may extend from the lower predetermined liquid level to the upper predetermined liquid level, for example, can be determined in advance with a high level of accuracy, the accuracy of the measurement of the flow rate q usually mainly depends on the accuracy of the measurement of the point in time $t_U$ at which the liquid level reaches the upper predetermined liquid level, and the point in time $t_L$ at which the liquid level reaches the lower predetermined liquid level.

BRIEF DESCRIPTION OF THE FIGURES

FIG. 4 shows a cross sectional view along the dotted line VI-VI in FIG. 3.

DETAILED DESCRIPTION

Figures 1, 2:
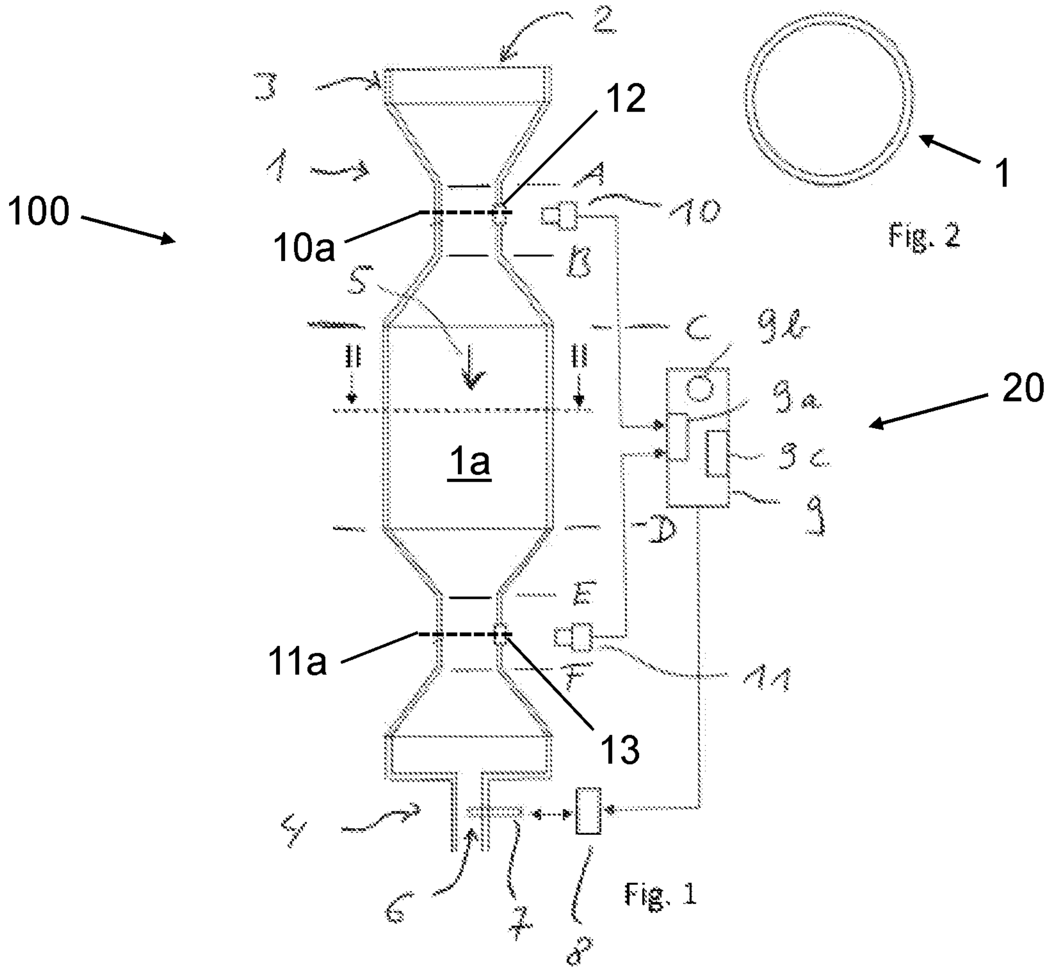
FIG. 1 schematically shows a side view of the device.
FIG. 2 schematically shows a cross sectional view along the dotted line II-II in FIG. 1.

FIG. 1 shows an embodiment of a device 100 for measuring a flow rate of a liquid according to a first embodiment. The device 100 includes a tube 1 forming a flow channel 1*a*. Here, the tube 1 has an essentially straight and elongate shape. The flow channel 1*a* has a first end 3 and a second end 4. In FIG. 1, the tube 1 and the flow channel 1*a* are oriented vertically extending from an inlet port 2 at the first end 3 to an outlet port 6 at the second end 4. Under the influence of gravity or only under the influence of gravity, a liquid fed to the flow channel 1*a* via the inlet port 2 may flow through the flow channel 1*a* in a direction indicated by an arrow 5. The device 100 further includes a valve 7. The valve 7 may selectively open and close the flow channel 1*a*. In the embodiment depicted in FIG. 1, the valve 7 is disposed at the second end 4 of the flow channel. The device 100 may further include a valve drive 8 for operating the valve 7. Once the valve 7 closes the flow channel 1*a*, the level of a liquid fed to the flow channel 1*a* above the valve 7 via the inlet 2 rises above the valve 7.

The flow channel 1*a* includes several sections limited by marks A, B, C, D, E and F in FIG. 1. An upper section of the flow channel 1*a* extends from A to B. Here, the upper section AB has a constant cross sectional area. An intermediate section of the flow channel 1*a* extends from B to E. Here, the intermediate section BE includes a section extending from C to D which has a constant cross sectional area. In the embodiment depicted here, other sections of the intermediate section BE, extending from B to C and from D to E, respectively, each have a conical shape. The intermediate section BE extends between the valve 7 and the upper section AB. A lower section of the flow channel 1*a* extends from E to F. Here, the lower section EF has a constant cross sectional area. The lower section EF extends between the valve 7 and the intermediate section BE. A cross sectional area of the upper section AB is smaller than a maximum cross sectional area of the intermediate section BE extending from C to D, for example by a factor of 9 or more. Similarly, a cross sectional area of the lower section BE is smaller than the maximum cross sectional area of the intermediate section BE, for example by a factor of 9 or more.

The device 100 further includes a measuring unit 20. The measuring unit 20 includes an upper liquid level detection device 10, a lower liquid level detection device 11, and a control unit 9 in communication with the detection devices 10, 11. In the embodiment depicted in FIG. 1, the detection devices 10, 11 are disposed outside of the flow channel 1*a*.

The upper liquid level detection device 10 is configured to determine if, after the valve 7 has been closed, a liquid level in the flow channel 1*a* has reached an upper predetermined liquid level 10*a*, indicated by a dashed line in FIG. 1. The upper predetermined liquid level 10*a* may be determined by a position of the upper liquid level detection device 10 along the flow channel 1*a*, for example. Here, the upper liquid level detection device 10 and the upper predetermined liquid level 10*a* are located in the upper section AB of the flow channel 1*a*.

Similarly, the lower liquid level detection device 11 is configured to determine if, after the valve 7 has been closed, a liquid level in the flow channel 1*a* has reached a lower predetermined liquid level 11*a*, indicated by a dashed line in FIG. 1. The lower predetermined liquid level 11*a* may be determined by a position of the lower liquid level detection device 11 along the flow channel 1*a*, for example. Here, the lower liquid level detection device 11 and the lower predetermined liquid level 11*a* are located in the lower section EF of the flow channel 1*a*.

Alternatively, the lower predetermined liquid level 11*a* may be defined by the position of the valve 7 along the flow channel. In this case, the device 100 typically does not include the lower liquid level detection device 11.

A volume ΔV of a portion of the flow channel 1*a* through which the liquid level rises to the upper predetermined liquid level after the valve 7 has closed the flow channel 1*a* is usually given by the volume of the portion of the flow channel 1*a* extending from the lower predetermined liquid level 11*a* to the upper predetermined liquid level 10*a*.

In the embodiment of the device 100 depicted in FIG. 1, one or both of the liquid level detection devices 10, 11 may include an optical device such as a camera. For instance, these cameras may be configured to take images of optically transparent windows 12, 13 of the tube 1. For example, the windows 12, 13 may include glass windows which may be integrated in a wall of the tube 1. For instance, an inner wall of the tube 1 including the glass windows 12, 13 may be flat in order not to disturb the flow of liquid through the flow channel 1*a*.

For example, the two cameras of the liquid level detection devices 10, 11 may be configured to send image data to the control unit 9. The control unit 9 may comprise a processing unit 9*a*. The processing unit 9*a* may be configured to processes the image data received from the detection devices 10, 11 and to assess if a level of the liquid within the flow channel 1*a* has reached one or both of the detection windows 12, 13 associated with the cameras of the detection devices 10, 11, respectively.

The control unit 9 may further comprise a timer 9*b* in communication with the processing unit 9*a*. The timer 9*b* may be configured to determine and/or register a point in time $t_L$ at which a level of the liquid in the flow channel 1*a* has reached the lower predetermined liquid level 11*a*. And the timer 9*b* may be configured to determine and/or register a point in time $t_U$ at which a level of the liquid in the flow channel 1*a* has reached the upper predetermined liquid level 10*a*. The processing unit 9*a* may then be configured to measure or to determine a time $\Delta t = t_U - t_L$ which it takes the liquid in the flow channel 1*a* to rise from the lower predetermined liquid level 11*a* to the upper predetermined liquid level 10*a*. And based on Δt and on the known volume ΔV, the processing unit 9*a* may then determine the flow rate q of a liquid fed to the flow channel 1*a* above the valve 7, for example according to $q = \Delta V/\Delta t = \Delta V/(t_U - t_L)$. An indicator unit 9*c* may then display a numerical value of the flow rate q, for example.

The timer 9*b* may also be in communication with the valve drive 8. For instance, in alternative embodiments of the device 100 not explicitly depicted here where the lower predetermined liquid level 11*a* is defined by the position of the valve 7, the timer 9*b* may be configured to determine a point in time at which the valve 7 closes the flow channel 1*a*. In this case, $t_L$ may be given by the point in time at which the valve 7 closes the flow channel 1*a* and a liquid fed to the flow channel 1*a* via the inlet 2 starts to rise above the valve 7.

FIG. 2 illustrates a cross section of the flow channel 1*a* along the dotted line II-II in FIG. 1. Here and in all of the following, recurring features in different figures are designated with the same reference signs. According to FIG. 2, in the section CD of the flow channel 1*a*, the tube 1 has a circular cross section.

Figure 3:
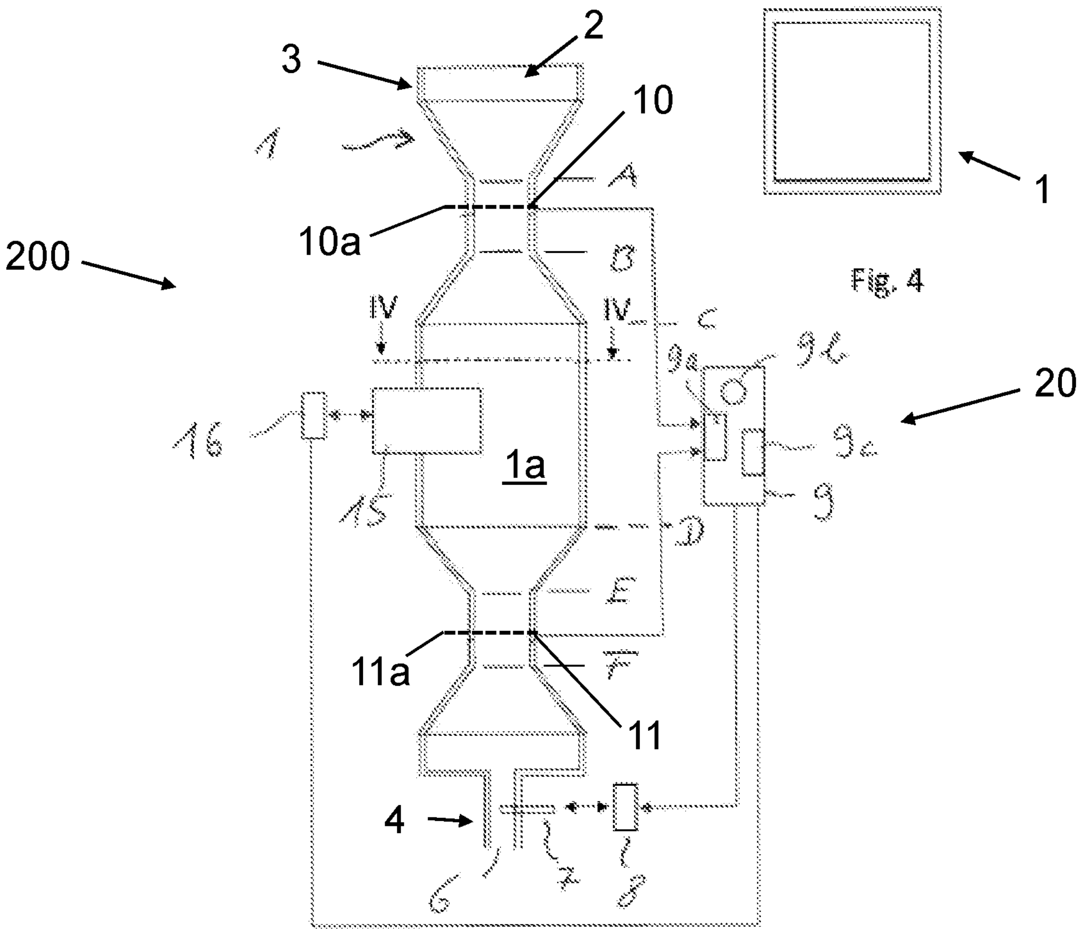
FIG. 3 schematically shows a side view of the device in another implementation.

FIG. 3 shows an embodiment of a device 200 for measuring a flow rate of a liquid according to a second embodiment. The device 200 of FIG. 3 is a variation of the device 100 of FIG. 1. For brevity and simplicity, in the following only those features of the device 200 of FIG. 3 which distinguish it from the device 100 of FIG. 1 are described in some detail. Unless explicitly stated otherwise, the device 200 of FIG. 3 may include the same features as the device 100 of FIG. 1.

FIG. 4 shows a cross section of the tube 1 of the device 200 of FIG. 3 along a dotted line IV-IV in highlighted in FIG. 3. In contrast to device 100 of FIG. 1, the tube 1 of the device 200 of FIG. 3 has a polygonal cross section, more specifically a rectangular cross section.

Further in contrast to the device 100 of FIG. 1, in the device 200 of FIG. 3 the upper liquid level detection device 10 comprises at least one electrode which may be electrically insulated from the material of the tube 1. For example, the tube 1 of the device 200 may be made of metal. The upper liquid level detection device 10 of the device 200 of FIG. 3 may be a device for measuring an electrical resistance, capacity or inductivity, for example. The lower liquid level detection device 11 of the device 200 may be identical to the first device 10 of the device 200 and work according to the same principle.

And still further in contrast to the device 100 of FIG. 1, the device 200 of FIG. 3 includes a piston 15 and a piston drive 16. The piston 15 is at least partially disposed in the flow channel 1*a*, more specifically in the section CD of the intermediate section BE of the flow channel 1*a*. The piston drive 16 is configured to selectively either reduce a volume of the intermediate section BE of the flow channel 1*a* by further advancing the piston into the flow channel 1*a*, or to increase the volume of the intermediate section BE of the flow channel 1*a* by retracting or by at least partially retracting the piston from the flow channel 1*a*.

The invention claimed is:

1. A device for measuring a flow rate of a liquid, comprising:

a flow channel, a valve for selectively opening and closing the flow channel, and a measuring unit configured to determine, after the valve has closed the flow channel, a time Δt which it takes a liquid fed to the flow channel above the valve to rise to an upper predetermined liquid level in the flow channel;

wherein the flow channel comprises an upper section including the upper predetermined liquid level and an intermediate section extending between the valve and the upper section, wherein a maximum cross sectional area in the upper section is smaller than a minimum cross sectional area in the intermediate section.

2. The device of claim 1, wherein the measuring unit is configured to determine a flow rate q of a liquid fed to the flow channel above the valve according to $q = \Delta V/\Delta t$, wherein ΔV is a known volume of a portion of the flow channel through which the liquid rises to the upper predetermined liquid level.

3. The device of claim 1, wherein the measuring unit comprises an upper liquid level detection device configured to determine if a liquid level in the flow channel has reached the upper predetermined liquid level.

4. The device of claim 3, wherein the measuring unit is configured to determine Δt based on a point in time $t_U$ at which the liquid level reaches the upper predetermined liquid level.

5. The device of claim 3, wherein the measuring unit comprises a lower liquid level detection device configured to determine if a liquid level in the flow channel has reached a lower predetermined liquid level disposed in between the valve and the upper predetermined liquid level.

6. The device of claim 5, further comprising an assembly disposed at least partially in the flow channel and configured to change a volume of the flow channel in between the valve and the upper predetermined liquid level, or in between the lower predetermined liquid level and the upper predetermined liquid level.

7. The device of claim 6, wherein the assembly comprises a movable piston.

8. The device of claim 5, wherein the upper liquid level detection device and/or the lower liquid level detection device comprises at least one of a liquid sensor, a contact sensor, an optical sensor and an electrical sensor, in particular an electrical resistance sensor.

9. The device of claim 5, wherein the measuring unit is configured to determine Δt further based on a point in time tr at which the liquid level reaches the lower predetermined liquid level.

10. The device of claim 4, wherein the measuring unit is configured to determine Δt according to $\Delta t = t_U - t_L$.

11. The device of claim 1, wherein the flow channel has a first end and a second end below the first end, an inlet port at the first end, and an outlet port at the second end.

12. The device of claim 11, wherein the valve is configured to close the flow channel at or above the outlet port.

13. The device of claim 1, wherein the flow channel comprises a lower section including the lower predetermined liquid level and extending between the valve and the intermediate section, wherein a maximum cross sectional area in the lower section is smaller than the minimum cross sectional area in the intermediate section.

14. A device for measuring a flow rate of a liquid, comprising:

a flow channel, a valve for selectively opening and closing the flow channel, a measuring unit configured to determine, after the valve has closed the flow channel, a time Δt which it takes a liquid fed to the flow channel above the valve to rise to an upper predetermined liquid level in the flow channel;

wherein the measuring unit comprises an upper liquid level detection device configured to determine if a liquid level in the flow channel has reached the upper predetermined liquid level, and wherein the measuring unit comprises a lower liquid level detection device configured to determine if a liquid level in the flow channel has reached a lower predetermined liquid level disposed in between the valve and the upper predetermined liquid level, and an assembly disposed at least partially in the flow channel and configured to change a volume of the flow channel in between the valve and the upper predetermined liquid level, or in between the lower predetermined liquid level and the upper predetermined liquid level.

15. The device of claim 14, wherein the assembly comprises a movable piston.

* * * * *